United States Patent [19]

Keller et al.

[11] 4,301,476

[45] Nov. 17, 1981

[54] PHASE CONTROLLED SHUTTERING SYSTEM WITH SELECTABLE SHUTTERED AND UNSHUTTERED MODES

[76] Inventors: Patrick N. Keller, 820 Alene Ave.; Leon G. Biesiadecki, 1400 Wayne St., Space 42, both of Ridgecrest, Calif. 93555

[21] Appl. No.: 191,599

[22] Filed: Sep. 29, 1980

[51] Int. Cl.³ .......................... H04N 5/30; H04N 5/26
[52] U.S. Cl. ................................... 358/209; 358/217; 358/225
[58] Field of Search ................. 358/99, 209, 210, 211, 358/214, 217, 225

[56] References Cited

U.S. PATENT DOCUMENTS 4,171,529  10/1979  Silberberg et al. ............. 358/225 X Primary Examiner—Robert L. Richardson
Attorney, Agent, or Firm—R. S. Sciascia; W. Thom Skeer

[57] ABSTRACT

A shutter for an electro-cinematographic camera has synchronizing provisions to make high-speed exposures during the retrace interval of associated viewing equipment. Provision is also made for rapid change to unshuttered operation without use of a monitor by a positive lock mechanism.

16 Claims, 5 Drawing Figures

PHASE CONTROLLED SHUTTERING SYSTEM WITH SELECTABLE SHUTTERED AND UNSHUTTERED MODES

BACKGROUND OF THE INVENTION

1. Field of the Invention

This invention pertains to the field of electrocinematography. More particularly the invention pertains to a cinematographic camera which is frame synchronized with a video monitor. By way of further characterization, but without limitation thereto the invention will be described as it pertains to an improved shutter mechanism and synchronizing arrangement for a Silberberg camera.

2. Description of the Prior Art

It is known in the prior art to use a mechanical, disc-type shutter in an electronic video camera to improve the image resolution of video cameras. Such a camera, known as a Silberberg camera, is described in U.S. Pat. No. 4,171,529 issued on Oct. 16, 1979 to George Silberberg et al. for "Phase Controlled Shuttering System".

Although satisfactory for its intended purpose and a marked improvement over prior unshuttered cameras for high-speed subjects, problems develop with the synchronization after periods of extensive use, and with performing rapid shifts between high-speed, unshuttered operation.

The former problems are related to the drive arrangement for the motor synchronization. These problems are currently cured by replacement of the drive belt and service or alignment of the mechanism. However, such a malfunction, when it occurs, causes down-time and loss of the use of the drive. Since the high-speed subjects are often expensive to retake and of a transistory nature, the reliable function of the camera is of utmost importance.

The problem of rapid conversion to unshuttered operation is, likewise, important since often several cameras are used in a take and often the available monitor is remote from the camera location. Therefore, the ability of an on-site camera operator to positively set the camera to an unshuttered position is highly desirable.

SUMMARY OF THE INVENTION

The invention provides an improved shutter having two discoid blades which are indexably positioned to expose co-operating apertures to provide a focal plane shutter slit. A positive stop is provided to index the shutters in an aligned position with respect to the image tube to permit unshuttered camera operation.

Accordingly, it is an object of the present invention to provide an improved shutter for a video camera.

Another object of the invention is to provide a high-speed video shutter for retrace synchronization.

A further object of the invention is to provide for a synchronized video shutter which may be adjusted to a selected one of a plurality of shutter speeds without loss of synchronization ability.

These and other objects of the invention will become apparent to one versed in the video camera arts in view of the following descriptions, claims, and drawings.

DESCRIPTION OF THE PREFERRED EMBODIMENT

Figure 1:
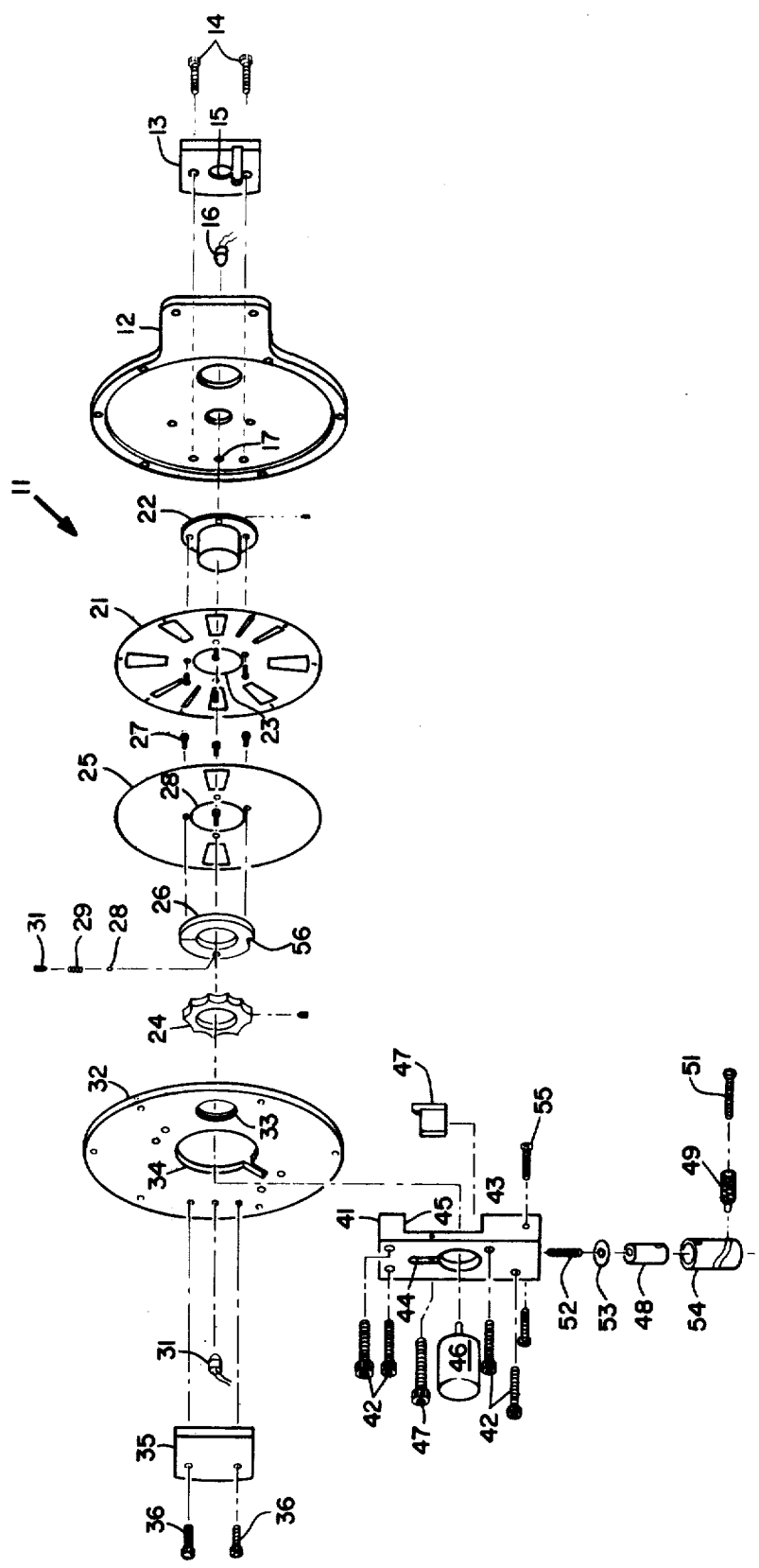
FIG. 1 is an exploded view of a shutter according to the invention.

Referring to FIG. 1, an improved shutter is indicated generally at 11. Shutter 11 includes a base plate 12 which is configured to mount upon a particular camera in use. Base plate 12 has a rear cover 13 secured thereto by threaded fasteners 14 and includes a depression 15 therein. A photo detector 16, for example a photo transistor, is mounted in depression 15 to be held in cooperative relation with an aperture 17 in base plate 12. A shutter disc 21 mounts on a disc collar 22 and contains a plurality of shutter speed selection light passages, to be more completely described herein.

Disc 21 may be any lightweight opaque material which may be rotated at high rates of speed. In some instances disc 21 may be made of metal and the light passages may be apertures cut therethrough. Such constructions are common in the shuttering parts and need not be more completely described however, it should be noted that disc 21 could, if desired, be made of a light transparent material which has been masked to render it opaque except for the light passages.

Collar 22 extends through a central aperture 23 in shutter disc 21 and provides for driving engagement and mounting as will be herein described.

A speed selector ring, indicated at 24, is affixed to collar 22 and provides a manual engagement means such that collar 22 and disc 21 may be turned. A second shutter disc 25 has a selector disc collar 26 attached thereto by means of threaded fasteners indicated generally at 27 such that collar 26 and shutter disc 25 form an integral unit. A detent ball 28 is spring biased by a spring 29 and a securing fastener 31 to extend from the forward face of collar 26. This detent ball 28 engages detents, not shown, on the back side of speed selector ring 24. Collar 22 and selector collar 26 together with the spring detent and speed selector ring 24 comprise an indexing means whereby speed selector disc 25 may be selectively aligned with predetermined ones of the light passages on first shutter disc 21.

A front plate 32 has a threaded aperture 33 used to mount an objective lens and a central aperture 34 extending therethrough. Front plate 32 also has a front cover 35 which is held thereto by means of threaded fasteners 36. Front cover 35 provides a housing means for a suitable light source. In the illustrated embodiment, the light source is a light emitting diode 37. If desired, light emitting diode 37 could be replaced by other light sources including an aperture and associated light collective optics such that ambient light could be used as the synchronizing light source. A motor mount 41 is secured to the front of front plate 32 by means of threaded fasteners 42. Motor mount 41 has a central aperture 43 and a clamping slot 44 formed therein. The sides of motor mount 41 are cut away to provide a notch indicated at 45. Notch 45 and the lateral dimensions of motor mount 41 are chosen such that speed selector ring 24 extends therethrough and may be gripped by the fingers of an operator. A motor 46 is mounted in aperture 43 and is drivingly connected to speed collar 22 by conventional means.

Motor 46, once positioned, is secured with a threaded fastener 47 which extends transversely across slot 44 and compresses motor mount 41 sufficiently to frictionally engage motor 46. A lock bar 47 is carried in a slot on the back side of motor mount 41 to be controlled by means of a cam plunger 48.

Cam plunger 48 is attached to handle 49 by means of a threaded fastener 51. Handle 49 moves cam plunger 48 in a vertical direction against a spring pressure provided by spring 52 and spring plate 53. Cam plunger 48 is controlled by handle 49 moving in a cam slot cut in a cam tube 54 which is held to motor mount 41 by means of a threaded fastener 55. Lock bar 47 cooperates with a notch 56 cut in selector disc collar 26. Thus, by moving handle 49, a lock is provided to secure disc 25 against rotation by either motor 46 or speed selector ring 24.

A variety of locking mechanism may be used to actually lock bar 47 and selection among them depends on trade-offs which would be well within the skill of a person versed in the precision instrument and camera design arts.

Figure 2:
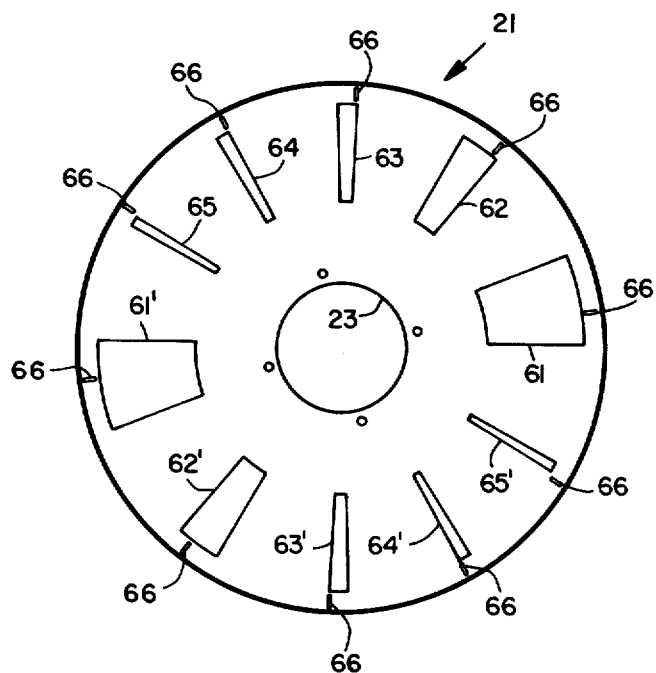
FIG. 2 is a plan view of a first shutter disc according to the invention.

Referring to FIG. 2, the details of the first shutter disc 21 are illustrated. Shutter disc 21 has a plurality of apertures spaced circumferentially about the surface thereof. These apertures are in two diametrically opposed sets indicated with primed and unprimed numbers. Apertures 61 and 61' are the largest apertures and provide the longest exposure while apertures 65 and 65' are the narrowest apertures and provide the shortest exposure. Aperture 61 and 61' have an angular dimension of 21°36'. Apertures 62 and 62' have an angular extent of 10°48', apertures 63 have an angular extent of 4°10', apertures 64 and 64' have an angular extent of 2°10', while apertures 65 and 65' have an angular extent of 1°52'. Thus, in the illustrated embodiment, each successive aperture provides a light passage of smaller area such that the time of light passage through the rotating shutter is sequentially diminished as each shutter aperture obturates the light passing therethrough. Of course, the angular dimensions of the various apertures may be varied as well as the progression of light passages afforded thereby. These changes are within the range of skills normally attributed to artisans working in this art.

Figure 2A:
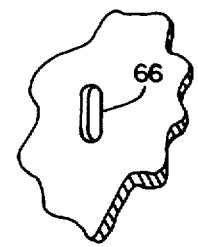
FIG. 2(a) is an enlarged view of a synchronizing passage shown in FIG. 2.

Just beyond the apertures 61 through 65, a series of smaller apertures 66 are located. As shown, the position of apertures 66 is somewhat eccentric in relation to apertures 61 through 64. This is because centering of the aperture over the light passage is synchronized with the leading edge of the blanking trace of the video camera and a different spacing is required for narrow and wide apertures. The shape of aperture 66 is more clearly shown in FIG. 2(a) which is an enlargement of a portion of FIG. 2.

Figure 3:
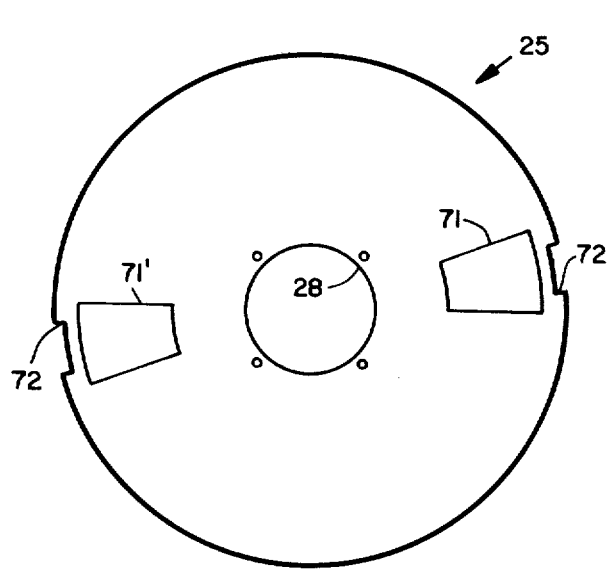
FIG. 3 is a plan view of a second shutter disc to cooperate with the disc of FIG. 2.

Referring to FIG. 3, an embodiment of the second shutter disc 25 is illustrated. Shutter disc 25 has diametrically spaced apertures 71 and 71'. Apertures 71 and 71' in the illustrated embodiment are 23°36' in extent and thus are 2° wider than apertures 61 in shutter disc 21. This permits 1° misalignment without unintentionally reducing the aperture on the largest selectable aperture shutter disc 21. Notches 72 cut in the periphery of shutter disc 25 provide alignment with apertures 66 in shutter disc 21. Notches 72 and 72' are of sufficient angular extent to allow for the variation in location of aperture 66. Thus, it may be seen that the size of the aperture which obturates light flowing through objective mounting 33 may be controlled by relative rotation of discs 25 and 21.

Figure 4:
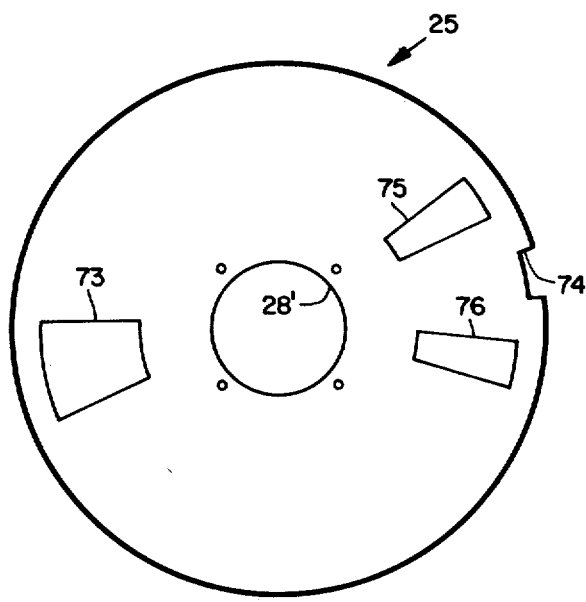
FIG. 4 is a plan view of a shutter disc which may be used rather than the disc of FIG. 3.

Referring to FIG. 4, a second construction of second disc 25 is illustrated at 25'. As shown, an aperture 73 is positioned in a similar position to aperture 71 of FIG. 3 except that a single aperture is employed. A cooperating notch 74 provides for synchronization alignment in the same manner that notches 72 and 72' were employed in the construction of FIG. 3. Because such a shutter would be out-of-balance at high shutter speeds, a compensating plurality of apertures 75 and 76 are located asymmetrically opposite aperture 73. Apertures 75 and 76 are angularly separated such that they cooperate with no aperture on shutter disc 21 but rather are positioned in the intertice provided by the shutter disc 21 material when a given aperture is aligned with aperture 73. By dimensioning apertures 75 and 76, a balance may be obtained such that the material removed from shutter disc 25' by apertures 75, 76 and notch 74 are equal in angular momentum to that provided by aperture 73. Such an arrangement permits the use of motors having different driving speeds or other varieties of shuttering techniques not possible with the arrangement of FIG. 3.

In operation, the operator engages the lock bar 47 in collar 26 by means of rotation of handle 49 and selects a desired shutter speed by movement of speed selector ring 24, which may be conventionally calibrated for this purpose.

Adjustment of selector ring 24, as previously described, aligns the apertures 71 and 71', or 73, with a selected aperture 61 through 65 on shutter disc 21. Release of handle 49 and energization of motor 46 causes the shutter pair to rotate and provide a focal plane chopping action, familiar to those in the cinematographic arts, to be achieved.

If unshuttered action, conventional in the video camera arts, is desired, the operator locks shutter 25 by movement of handle 49, selects the largest aperture, and provides camera operation without encrization of motor 46.

As would be familiar to those versed in the art, base plate 12 may be configured to cooperate with any conventional camera structure. Likewise, the various illustrative parts may be made of a wide variety of materials common in the precise instrument and camera fabrication arts. For example, aluminum, brass, stainless steel, and a wide variety of plastic materials may be used if desired.

The aforegoing description taken together with the appended claims constitute a disclosure such as to enable a person skilled in the electro-cinemagraphic arts and having the benefit of the teachings contained therein to make and use the invention. Further, the structure herein described meets the aforestated objects of the invention and generally constitutes a meritious advance in the arts unobvious to such a worker not having the benefit of these teachings.

What is claimed is:

1. A shutter for a video camera comprising:
   a first disc of opaque material having,
      a first series of light passages arranged circumferentially about the center of said first disc, and
      a second series of light passages equal in number to said first series of light passages and arranged circumferentially about the center of said first disc each light passage of said second series being positioned in a predetermined angular relationship with an associated one of said light passages in said first series;

a second disc of opaque material having,
  a third series of light passages arranged circumferentially about the center of said second disc, and
  synchronizing passage means arranged in a predetermined relationship with respect to said third series of light passages;

indexing means connected to said first and second discs for selective alignment of predetermined ones of said first and third series of light passages; and a housing surrounding said first and second discs and having,
  an image aperture aligned with said first and third series of light passages, and
  synchronizing signal generating means in alignment with said second series of light passages and said synchronizing passage means.

2. A shutter according to claim 1 further including a synchronous drive means connected to said first and second discs for rotation thereof.

3. A shutter according to claim 1 further including a stop means mounted on said housing for engaging said indexing means to selectively position said first and second discs in a reference datum position.

4. A shutter according to claim 1 wherein said first series of light passages includes two sets of passages spaced diametrically opposite one another with individual passages in each set varying from adjacent passages in area by a predetermined amount.

5. A shutter according to claim 1 wherein said second series of light passages are positioned in an angular relationship to insure that at a predetermined velocity the indexed first and third series light passages are in alignment with said image aperture during a standard video camera retrace interval.

6. A shutter according to claim 1 wherein said synchronizing signal generating means includes a source of light and a photoelectric detector mounted on opposite sides of said indexed first and second discs.

7. A shutter according to claim 1 wherein said synchronizing passage means includes a circumferential passage on the outer edge of said second disc.

8. A shutter according to claim 1 wherein said third series of light passages and said synchronizing passage means are symmetrically positioned on said second disc.

9. A shutter according to claim 1 wherein said third series of light passages and said synchronizing passage means are asymmetrically positioned on said second disc.

10. A shutter according to claim 2 further including a stop means mounted on said housing for engaging said indexing means to selectively position said first and second discs in a reference datum position.

11. A shutter according to claim 9 wherein said first series of light passages includes two sets of passages spaced diametrically opposite one another with individual passages in each set varying from adjacent passages in area by a predetermined amount.

12. A shutter according to claim 10 wherein said second series of light passages are positioned in an angular relationship to insure that at a predetermined velocity the indexed first and third series light passages are in alignment with said image aperture during a standard video camera retrace interval.

13. A shutter according to claim 11 wherein the synchronizing signal generating means includes a source of light and a photoelectric detector mounted on opposite sides of said indexed first and second discs.

14. A shutter according to claim 12 wherein said synchronizing passage means includes a circumferential passage on the outer edge of said second disc.

15. A shutter according to claim 13 wherein said third series of light passages and said synchronizing passage means are symmetrically positioned on said second disc.

16. A shutter according to claim 13 wherein said third series of light passages and said synchronizing passage means are asymmetrically positioned on said second disc.